(12) United States Patent
Liu

(10) Patent No.: US 9,089,216 B2
(45) Date of Patent: Jul. 28, 2015

(54) HOLDER ASSEMBLY

(71) Applicant: Top Victory Investments Ltd., Kowloon (HK)

(72) Inventor: Chien-Chen Liu, New Taipei (TW)

(73) Assignee: Top Victory Investment Ltd., Kowloon (HK)

( * ) Notice: Subject to any disclaimer, the term of this patent is extended or adjusted under 35 U.S.C. 154(b) by 60 days.

(21) Appl. No.: 14/013,101

(22) Filed: Aug. 29, 2013

(65) Prior Publication Data
US 2015/0060615 A1   Mar. 5, 2015

(51) Int. Cl.
| F16M 11/00 | (2006.01) |
| A47B 97/00 | (2006.01) |
| F16M 11/08 | (2006.01) |
| F16M 11/06 | (2006.01) |
| F16M 11/22 | (2006.01) |
| F16M 11/20 | (2006.01) |

(52) U.S. Cl.
CPC ............. *A47B 97/00* (2013.01); *F16M 11/06* (2013.01); *F16M 11/08* (2013.01); *F16M 11/22* (2013.01); *A47B 2097/005* (2013.01); *F16M 11/2007* (2013.01)

(58) Field of Classification Search
USPC ........ 248/474, 124.1, 125.1, 125.7, 917, 918, 248/920, 684, 461, 165; 361/679.04; 211/203
See application file for complete search history.

(56) References Cited

U.S. PATENT DOCUMENTS

| 979,626 | A | * | 12/1910 | Wolff | 248/461 |
| 1,364,169 | A | * | 1/1921 | Wolff | 248/461 |
| 2,445,489 | A | * | 7/1948 | Mangold | 108/41 |
| 2,542,137 | A | * | 2/1951 | Hanson | 248/171 |
| 3,464,664 | A | * | 9/1969 | Nugent | 248/435 |
| 4,807,837 | A | * | 2/1989 | Gawlik et al. | 248/125.8 |
| 4,915,332 | A | * | 4/1990 | Ouellette | 248/171 |
| 6,343,006 | B1 | * | 1/2002 | Moscovitch et al. | 361/679.04 |
| 6,554,238 | B1 | * | 4/2003 | Hibberd | 248/278.1 |
| 7,246,780 | B2 | * | 7/2007 | Oddsen, Jr. | 248/282.1 |
| 7,529,083 | B2 | * | 5/2009 | Jeong | 361/679.04 |
| 7,658,029 | B1 | * | 2/2010 | Moody et al. | 42/72 |
| 8,162,268 | B1 | * | 4/2012 | Huang | 248/124.1 |
| D660,308 | S | * | 5/2012 | Huang | D14/452 |
| 8,282,052 | B2 | * | 10/2012 | Huang | 248/125.1 |
| 2006/0238967 | A1 | * | 10/2006 | Carson et al. | 361/681 |

* cited by examiner

*Primary Examiner* — Bradley Duckworth
(74) *Attorney, Agent, or Firm* — Alan D. Kamrath; Kamrath IP Lawfirm, P.A.

(57) ABSTRACT

A holder assembly for holding a displaying device is disclosed. The holder assembly includes a body, a first arm, a second arm and a base. The body includes an outer surface and an inner surface. An accommodating space is formed by the inner surface. A first opening is formed on the body and connected to the accommodating space. A first connecting portion and a first pivoting portion are disposed on two ends of the first arm. A second connecting portion and a second pivoting portion are disposed on two ends of the second arm. The first and second connecting portions are connected to the displaying device. The first and second pivoting portions are pivotally disposed on the outer surface. The base includes a sliding portion and a plurality of supporters. The sliding portion is slidably connected to the inner surface. The supporters are pivotally disposed on the sliding portion.

10 Claims, 10 Drawing Sheets

HOLDER ASSEMBLY

BACKGROUND OF THE INVENTION

1. Field of the Invention

The present invention relates to a holder assembly, and more particularly, to a holder assembly for holding the dual-monitor displaying device.

2. Description of the Prior Art

A plurality of displaying devices is utilized to show image and information at public place, such as the office, the exhibition site and the department store. A conventionally independent holder is disposed on each displaying device for stably holding the displaying device. The conventional holder has drawbacks of huge volume and inconvenient assembly/disassembly. Further, a specific holder is developed to dispose on a dual-monitor displaying device. However, the holder for supporting the dual-monitor displaying device has drawbacks of huge volume and difficult adjustment of a relative angle of monitors.

SUMMARY OF THE INVENTION

The present invention aims to provide a holder assembly for holding the dual-monitor displaying device, decreasing the volume of a combination of the dual-monitor displaying device and the holder assembly, and increasing convenience of adjusting the relative angle of the monitors of the dual-monitor displaying device.

According to the disclosed invention, the holder assembly for holding the dual-monitor displaying device is disclosed. The holder assembly includes a body, a first arm, a second arm and a base. The body includes an outer surface and an inner surface opposite to each other. An accommodating space is formed by the surrounding inner surface. A first opening is formed on an end of the body and connected to the accommodating space. A first connecting portion is disposed on an end of the first arm, and a first pivoting portion is disposed on the other end of the first arm. The first pivoting portion is pivotally disposed on the outer surface, and the first connecting portion is connected to a monitor of the dual-monitor displaying device. A second connecting portion is disposed on an end of the second arm, and a second pivoting portion is disposed on the other end of the second arm. The second pivoting portion is pivotally disposed on the outer surface, and the second connecting portion is connected to the other monitor of the dual-monitor displaying device. The base includes a sliding portion and a plurality of supporters. The sliding portion is slidably connected to the inner surface. The supporters are pivotally disposed on the sliding portion. The sliding portion and the supporters correspond to the accommodating space.

According to an embodiment of the present invention, when the base is switched to a first mode, the sliding portion is located on the accommodating space and separated from the first opening, the supporters are adjacent and accommodated inside the accommodating space; when the base is switched to a second mode, the sliding portion is located on the first opening, the supporters are adjacent and out of the accommodating space; when the base is switched to a third mode, the sliding portion is located on the first opening, the supporters are located outside the accommodating space and separated to each other.

According to the embodiment of the present invention, the first pivoting portion and the second pivoting portion are disposed around the outer surface of the body in a tight fit manner.

According to the embodiment of the present invention, the outer surface includes a sunken portion whereon a step structure is formed. The first pivoting portion and the second pivoting portion are located on the sunken portion and align with the step structure.

According to the embodiment of the present invention, the first arm is symmetrically disposed relative to the second arm.

According to the embodiment of the present invention, the holder assembly further includes a cover. A second opening is formed on an end of the body opposite to the first opening and connected to the accommodating space. The cover is located on the second opening and slidably connected to the outer surface.

According to the embodiment of the present invention, the cover is slidably disposed between a first position and a second position. When the base is switched to the first mode, the sliding portion is adjacent to the second opening and contacts against the cover, and the cover axially moves to the second position.

According to the embodiment of the present invention, a slide track is axially disposed on the inner surface. A protrusion is radially disposed on the sliding portion, and the protrusion is slidably disposed on the slide track.

According to the embodiment of the present invention, when the base is switched from the second mode to the third mode, the supporters pivot relative to the sliding portion to 90 degrees.

According to the embodiment of the present invention, the holder assembly further includes a handle. Two ends of the handle are respectively connected to the outer surface.

The holder assembly of the present invention not only supports the dual-monitor displaying device, but also decreases volume of the combination of the dual-monitor displaying device and the holder assembly. The holder assembly is utilized to adjust the relative angle of monitors of the dual-monitor displaying device. The base can be accommodated inside the accommodating space of the body and the holder assembly further comprises the handle. The present invention provides convenience of assembly, disassembly and portability.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6-1 is a diagram of the base according to the preferred embodiment of the present invention.

DETAILED DESCRIPTION

Figure 1:
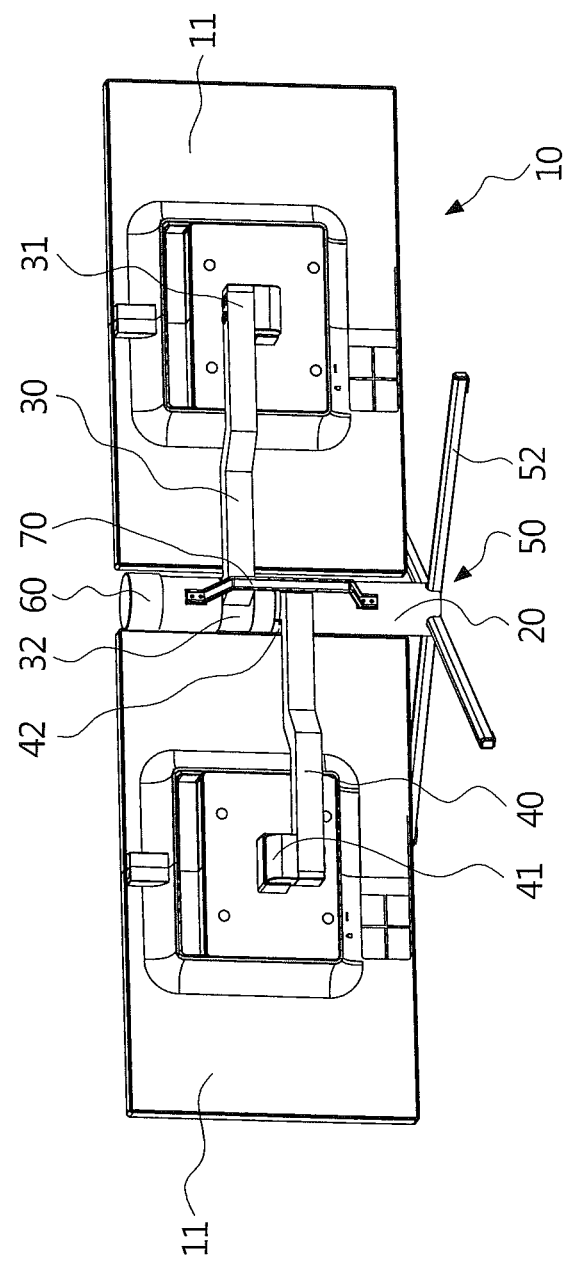
FIG. 1 is a diagram of a holder assembly and a displaying device according to a preferred embodiment of the present invention.
Figure 2:
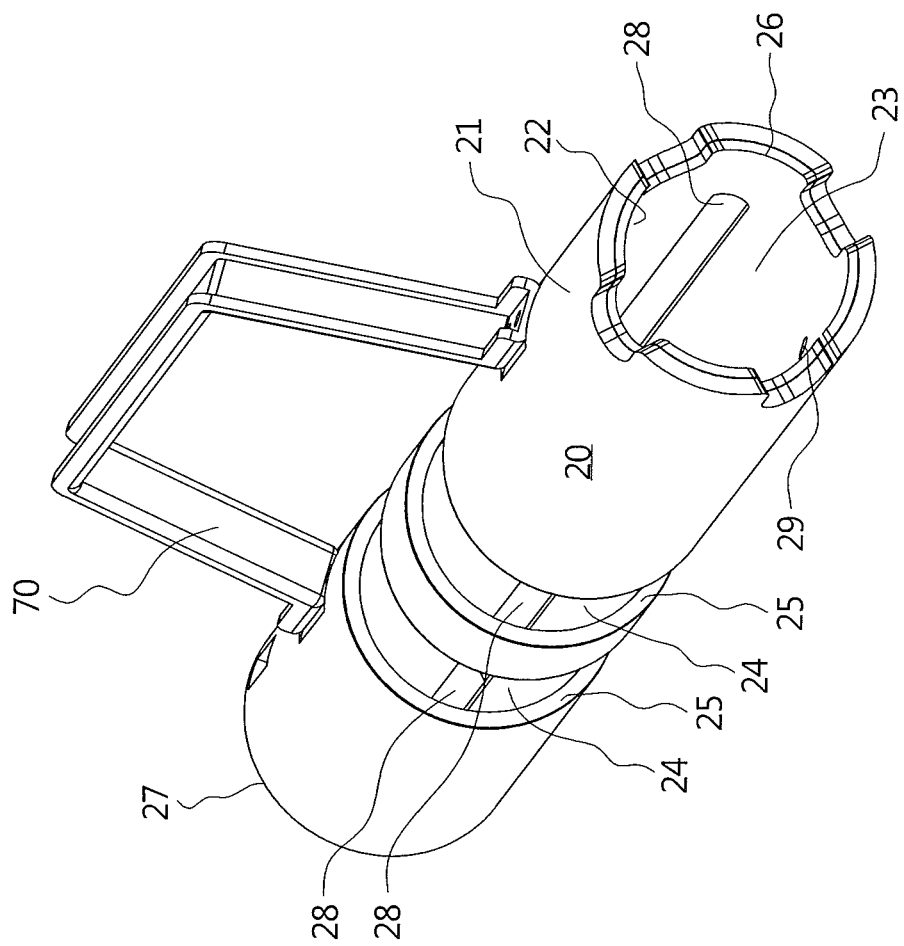
FIG. 2 is a diagram of a body and a handle according to the preferred embodiment of the present invention.
Figure 3:
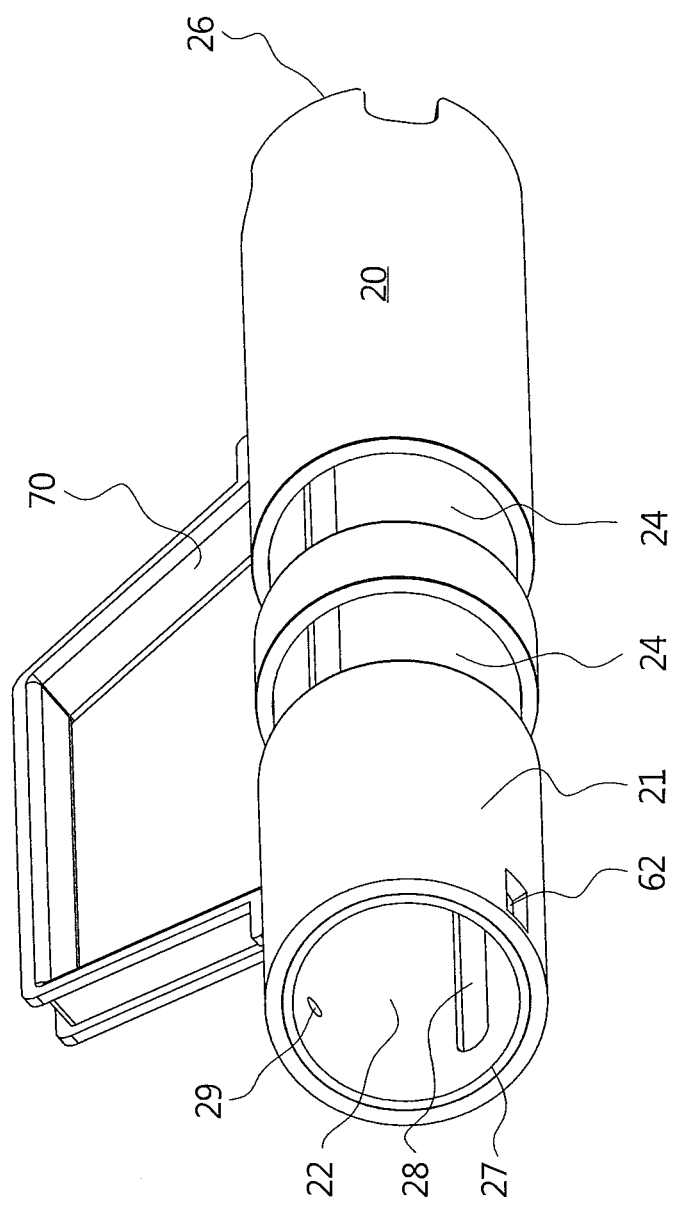
FIG. 3 is the other diagram of the body and the handle according to the preferred embodiment of the present invention.

Please refer to FIG. 1 to FIG. 9. A holder assembly 10 is utilized to hold a dual-monitor displaying device 11. The holder assembly 10 includes a body 20, a first arm 30, a second arm 40, a base 50, a cover 60 and a handle 70. In this embodiment, as shown in FIG. 2 and FIG. 3, the body 20 is a circular tube, which includes an outer surface 21 and an inner surface 22 opposite to each other. An accommodating space 23 is formed by the surrounding inner surface 22. The outer surface 21 includes two sunken portions 24. Step structures 25 are respectively formed on two sides of each sunken portion 24. A first opening 26 is formed on an end of the body 20. A second opening 27 is formed on the other end of the body 20 opposite to the first opening 26. The first opening 26 and the second opening 27 are respectively connected to two ends of the accommodating space 23.

Figure 4:
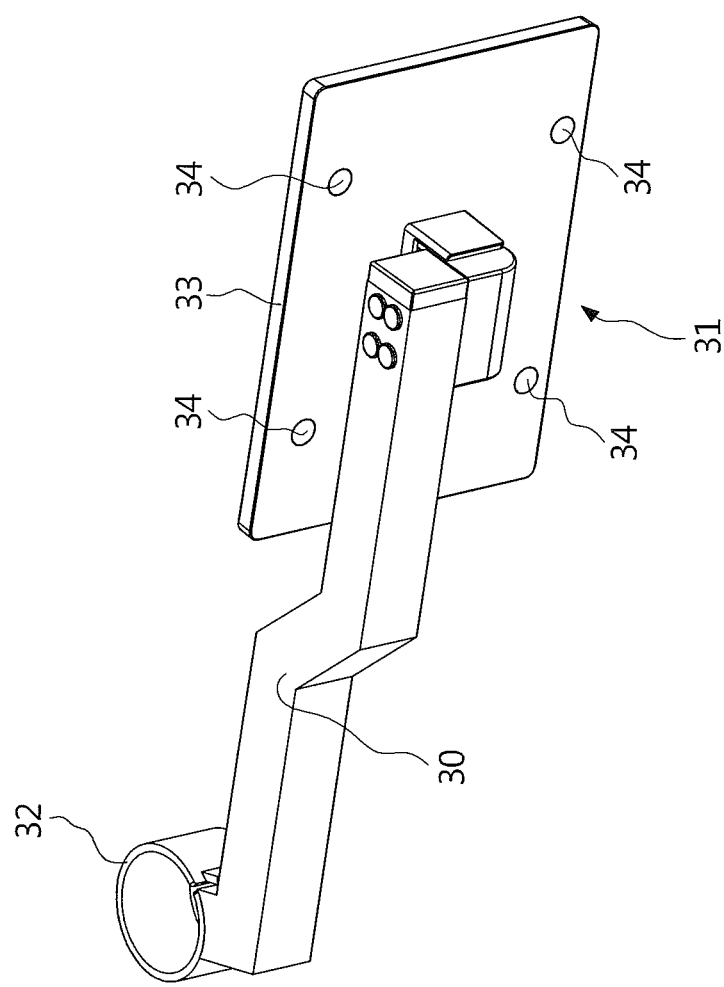
FIG. 4 is a diagram of a first arm according to the preferred embodiment of the present invention.

As shown in FIG. 4, a first connecting portion 31 is disposed on an end of the first arm 30, and a first pivoting portion 32 is disposed on the other end of the first arm 30. The first connecting portion 31 can be connected to a monitor of the dual-monitor displaying device 11. The first pivoting portion 32 is pivotally disposed on one of the sunken portions 24 of the outer surface 21. The first arm 30 can rotate relative to the body 20 in parallel, which means the first arm 30 can rotate via a rotary center, such as the body 20, at a plane parallel to a radial direction of the body 20. It is to say, the first pivoting portion 32 utilizes an annular structure to surround the outer surface 21 and is located inside the sunken portion 24. The first pivoting portion 32 is disposed on the outer surface 21 in a tight fit manner, so that the first arm 30 is disposed on the body 20 steady. The first arm 30 is difficult to rotate, and an external force is necessary to rotate the first arm 30.

Figure 5:
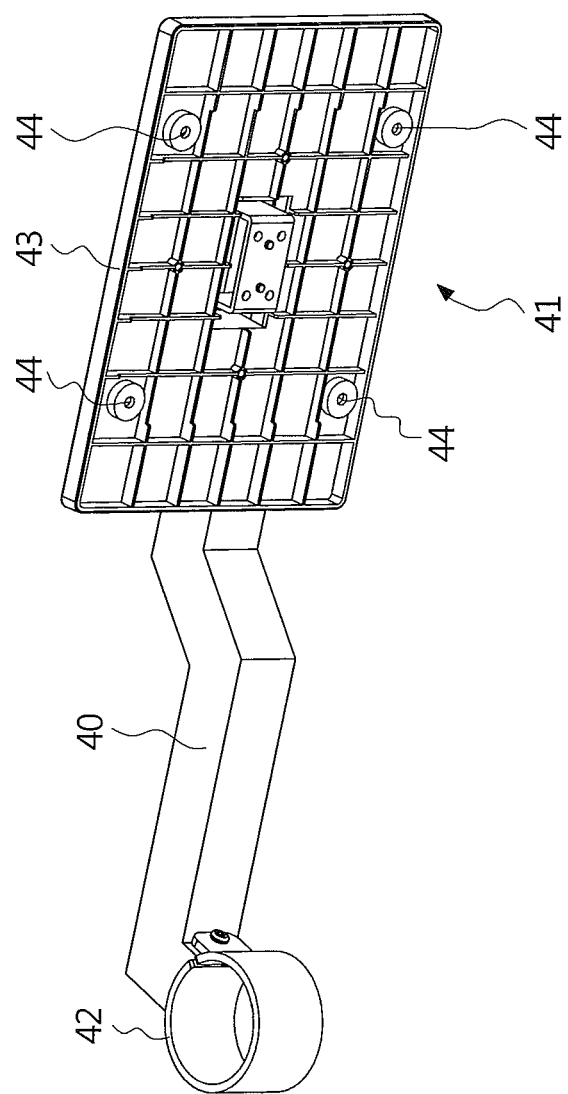
FIG. 5 is a diagram of a second arm according to the preferred embodiment of the present invention.

As shown in FIG. 5, a second connecting portion 41 is disposed on an end of the second arm 40, and a second pivoting portion 42 is disposed on the other end of the second arm 40. The second connecting portion 41 can be connected to the other monitor of the dual-monitor displaying device 11. In this embodiment, the first arm 30 is symmetrically disposed relative to the second arm 40. Structure and connection of the second arm 40 can be similar to ones of the first arm 30. The second pivoting portion 42 is pivotally disposed on the other sunken portion 24 of the outer surface 21. The first pivoting portion 32 and the second pivoting portion 42 do not overlap, and the second arm 40 can rotate relative to the body 20 at the parallel plane. The second pivoting portion 42 utilizes an annular structure to surround the outer surface 21 and is located inside the sunken portion 24. The second pivoting portion 42 is disposed on the outer surface 21 in the tight fit manner, and the second arm 40 is steady disposed on the body 20. Thus, a relative angle between the first arm 30 and the second arm 40 is difficult to alter, and the external force has to be applied to rotate the first arm 30 and the second arm 40 relative to the body 20, so as to adjust the relative angle between the first arm 30 and the second arm 40. Besides, the first pivoting portion 32 and the second pivoting portion 42 respectively align with the step structures 25. Appearance of the first pivoting portion 32, the second pivoting portion 42 and the body 20 is smooth and identical for preferred aesthetic.

In this embodiment, the first connecting portion 31 and the second connecting portion 41 are substantially connectors 33, 43 which cooperate with holes conforming to VESA (video electronics standards association) standard and disposed on a back of the displaying device 11. A screw is utilized to pass through the holes 34, 44 formed on the connecter 33, 43 and to lock inside the VESA holes, so as to fix the connectors 33, 43 on the back of the displaying device 11, and the first connecting portion 31 of the first arm 30 and the second connecting portion 41 of the second arm 40 can be respectively fixed on the dual-monitor displaying device 11. A parallel rotary function of the first arm 30 and the second arm 40 relative to the body 20 can be utilized to adjust the relative angle of the dual-monitor displaying device 11 according to user's demand. For example, the monitors of the dual-monitor displaying device 11 can face toward the same direction and show different information, so the user can simultaneously watch the different information; further, the monitors of the dual-monitor displaying device 11 can face toward the opposite directions and show the same information, so the users stand at the different positions can simultaneously watch the same information. In the other embodiment, the first connecting portion and the second connecting portion can further include a rotary mechanism, such as a shaft, and the displaying device can rotate relative to the parallel plane via the rotary mechanism for adjusting an inclination angle of the monitor.

Figure 6:
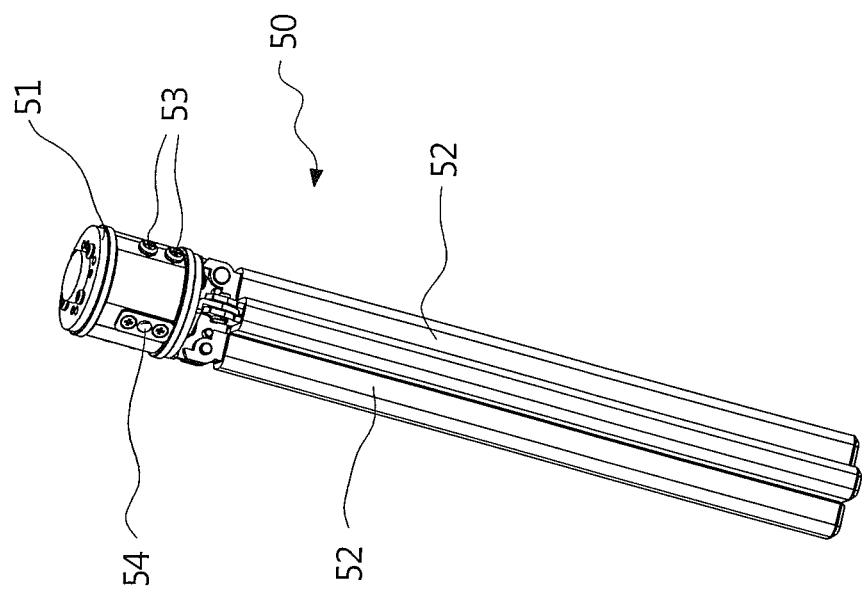
FIG. 6 is a diagram of a base according to the preferred embodiment of the present invention.
Figures 1, 6:
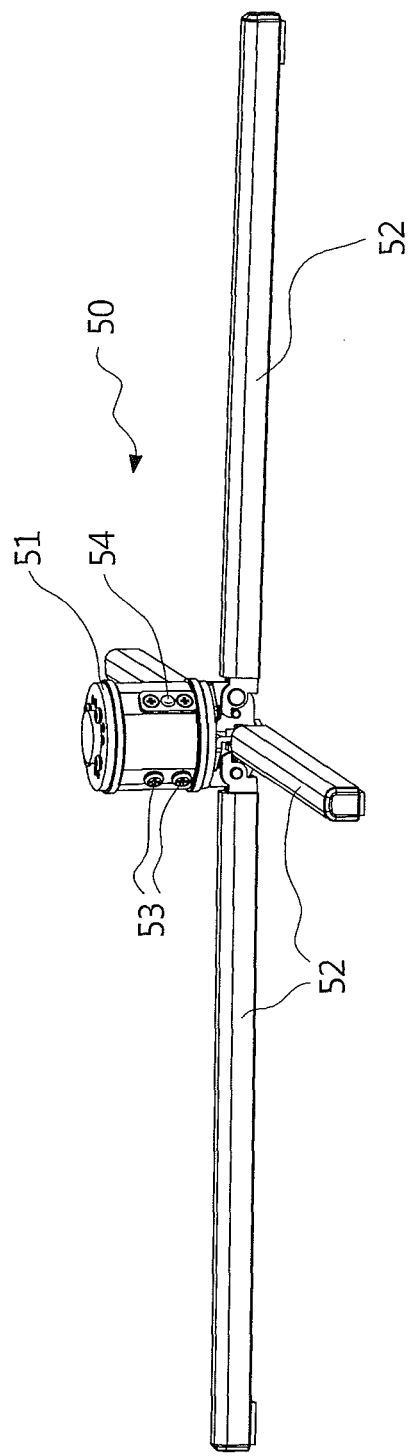

As shown in FIG. 6 and FIG. 6-1, the base 50 includes a sliding portion 51 and a plurality of supporters 52. The sliding portion 51 is slidably connected to the inner surface 22. The supporters 52 are pivotally disposed on the sliding portion 51. Contours of the sliding portion 51 and the supporters 52 correspond to the accommodating space 23. The supporters 52 can substantially be the long-strap pillar structures in symmetry. The supporters 52 can be folded to be adjacent to each other, as shown in FIG. 6; the supporters 52 further can be unfolded to space from each other, as shown in FIG. 6-1. A slide track 28 is axially disposed on the inner surface 22 of the body 20. A protrusion 53 is radially disposed on the sliding portion 51. The protrusion 53 is slidably disposed on the slide track 28, and the sliding portion 51 can slide inside the accommodating space 23 between the first opening 26 and the second opening 27.

Figure 7:
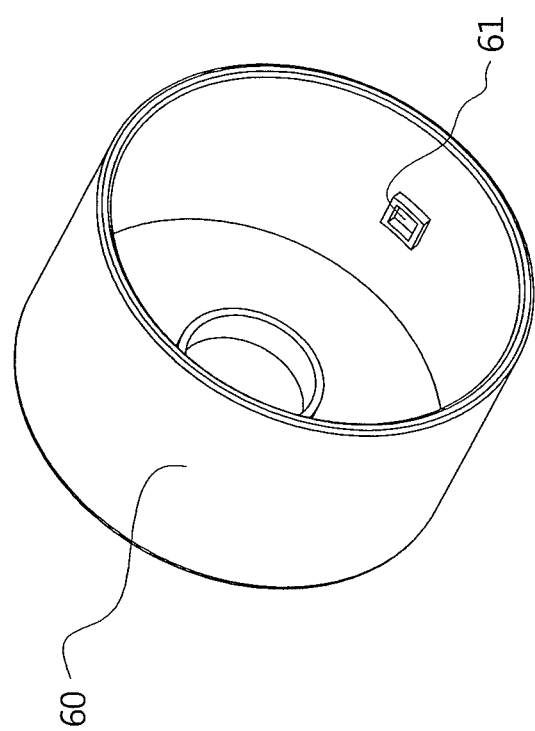
FIG. 7 is a diagram of a cover according to the preferred embodiment of the present invention.

As shown in FIG. 7, the cover 60 covers the second opening 27 and is slidably connected to the outer surface 21. A protrusion 61 is disposed inside the cover 60, a slide slot 62 is formed on the outer surface 21, and the protrusion 61 is slidably disposed on the slide slot 62. A movement of the protrusion 61 is constrained by two ends of the slide slot 62, and the cover 60 can slide between the first position and the second position. When the cover 60 moves to the first position, the cover 60 tightly contacts the second opening 27; when the cover 60 moves to the second position, the cover 60 is slightly spaced from the second opening 27.

Figure 8:
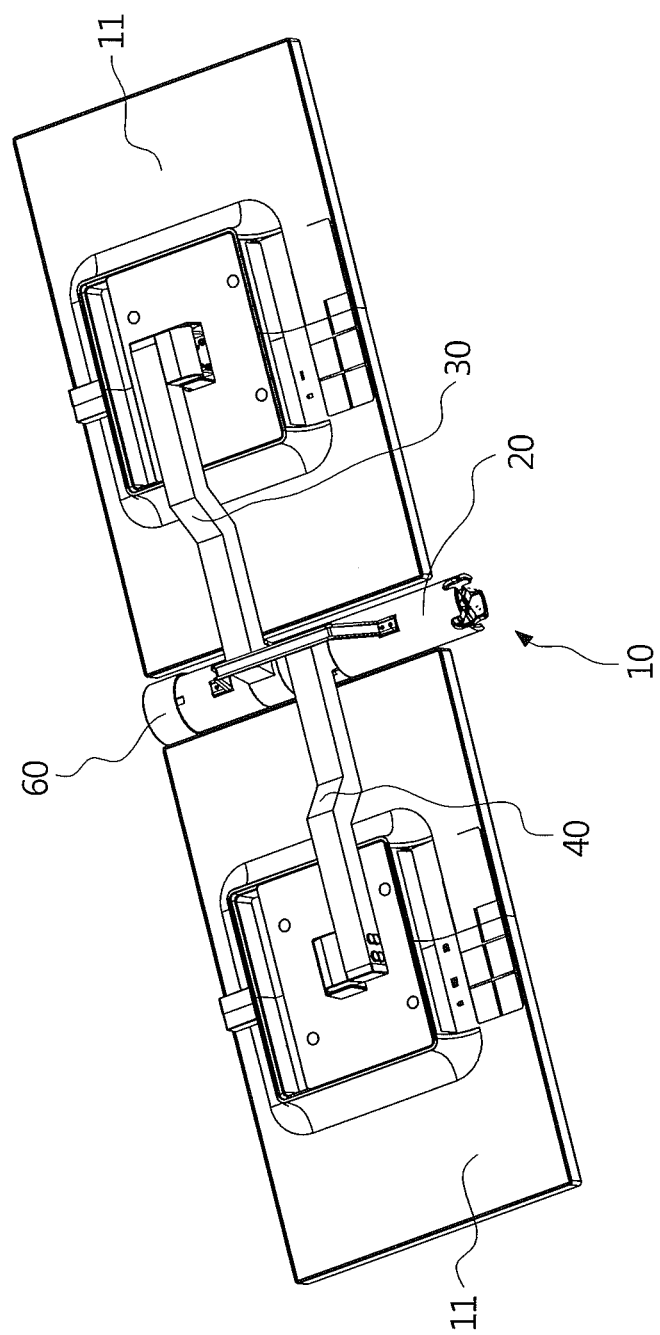
FIG. 8 is the other diagram of the holder assembly and the displaying device according to the preferred embodiment of the present invention.
Figure 9:
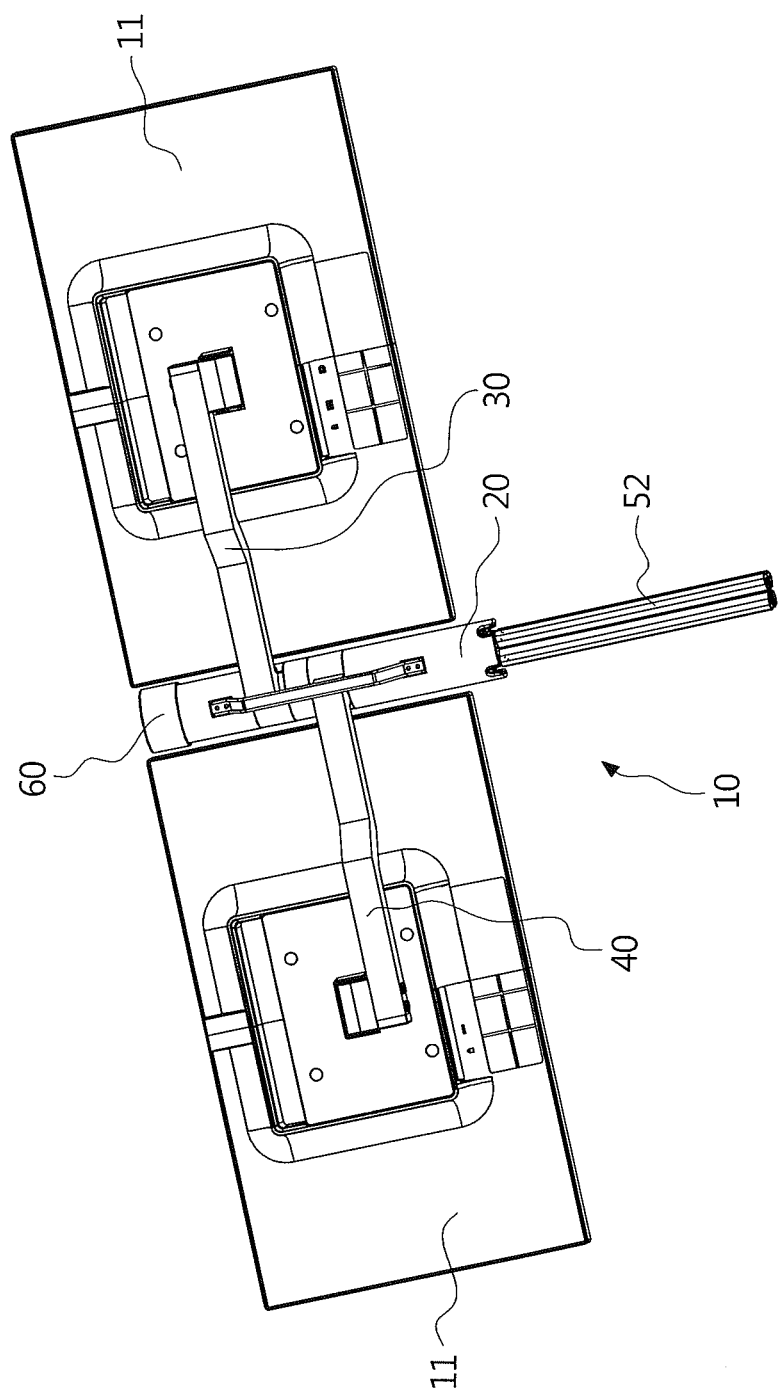
FIG. 9 is the other diagram of the holder assembly and the displaying device according to the preferred embodiment of the present invention.

The base 50 can be switched to a first mode, a second mode and a third mode. Variation of modes of the base 50 is not limited to the above-mentioned embodiments. When the base 50 is switched to the first mode, as shown in FIG. 8, the sliding portion 51 is located on the accommodating space 23 and separated from the first opening 26, and is further adjacent to the second opening 27 and contacts against the cover 60. The sliding portion 51 moves the cover 60 to axially slide to the second position. The supporters 52 are adjacent to each other and accommodated inside the accommodating space 23. It is to say, the base 50 is completely accommodated inside the accommodating space 23 and combined with the body 20. When the base 50 is switched to the second mode, as shown in FIG. 9, the sliding portion 51 is located on the first opening 26 and the supporters 52 are adjacent to each other and out of the accommodating space 23. As the base 50 is switched from the first mode to the second mode, the cover 60 moves from the second position to the first position by an external force and the cover 60 moves the sliding portion 51 toward the first opening 26. A part of the supporter 52 is exposed out of the first opening 26, the supporter 52 can be caught by the user to pull the base 50, to move the sliding portion 51 to the first opening 26. When the base 50 is switched to the third mode, as shown in FIG. 1, the sliding portion 51 is located on the first opening 26, the supporters 52 are located outside the accommodating space 23 and separated to each other, which means the supporters 52 of the base 50 at the second mode can be unfolded to stably stand on the plane. Further, the supporters 52 rotate relative to the sliding portion 51 to 90 degrees when the base 50 is switched from the second mode to the third mode. Operational variation of the base is not limited to the above-mentioned embodiment, and depends on actual demand.

As shown in FIG. 1, two ends of the handle 70 are respectively connected to the outer surface 21. The first pivoting portion 32 and the second pivoting portion 42 are located between the ends of the handle 70. The handle 70 is utilized to carry the holder assembly 10 combined with the dual-monitor displaying device 11. The monitors of the dual-monitor displaying device 11 can rotate to the face-to-face state, and then the dual-monitor displaying device 11 and the related holder assembly 10 can be conveniently carried via the handle 70.

As shown in FIG. 6, the sliding portion 51 can further radially stretch a resilient engaging component, such as a resiliently half-circular protrusion 54 disposed on a surface of the inner surface 22 where the sliding portion 51 contacts. Generally, the half-circular protrusion 54 protrudes from the surface of the sliding portion 51, and is able to move under the surface of the sliding portion 51 by the external force. Sunken slots 29 are respectively formed on the inner surface 22 of the body 22 adjacent to the first opening 26 and the second opening 27. The sunken slot 29 corresponds to the half-circular protrusion 54. When the base 50 is switched to the first mode, the half-circular protrusion 54 is engaged inside the sunken slot 29 adjacent to the second opening 27, and the sliding portion 51 is located on a position close to the second opening 27. When the base 50 is switched to the second mode or the third mode, the half-circular protrusion 54 is engaged with the sunken slot 29 adjacent to the first opening 26, and the sliding portion 51 is located on a position close to the first opening 26.

In conclusion, the holder assembly of the present invention not only can support the dual-monitor displaying device, but also can decrease volume of the combination of the dual-monitor displaying device and the holder assembly. The holder assembly is utilized to adjust the relative angle of monitors of the dual-monitor displaying device. The base can be accommodated inside the accommodating space of the body and the holder assembly further comprises the handle. The present invention provides convenience of assembly, disassembly and portability.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A holder assembly for holding a dual-monitor displaying device, the holder assembly comprising:
   a body, the body comprising an outer surface and an inner surface opposite to each other, an accommodating space being formed by the surrounding inner surface, a first opening being formed on an end of the body and connected to the accommodating space;
   a first arm, a first connecting portion being disposed on an end of the first arm, a first pivoting portion being disposed on the other end of the first arm, the first pivoting portion being pivotally disposed on the outer surface, the first connecting portion being connected to a monitor of the dual-monitor displaying device;
   a second arm, a second connecting portion being disposed on an end of the second arm, a second pivoting portion being disposed on the other end of the second arm, the second pivoting portion being pivotally disposed on the outer surface, the second connecting portion being connected to the other monitor of the dual-monitor displaying device;
   a base, the base comprising a sliding portion and a plurality of supporters, the sliding portion being slidably connected to the inner surface, the supporters being pivotally disposed on the sliding portion, the sliding portion and the supporters corresponding to the accommodating space.

2. The holder assembly of claim 1, wherein when the base is switched to a first mode, the sliding portion is located on the accommodating space and separated from the first opening, the supporters are adjacent and accommodated inside the accommodating space; when the base is switched to a second mode, the sliding portion is located on the first opening, the supporters are adjacent and out of the accommodating space; when the base is switched to a third mode, the sliding portion is located on the first opening, the supporters are located outside the accommodating space and separated to each other.

3. The holder assembly of claim 1, wherein the first pivoting portion and the second pivoting portion are disposed around the outer surface of the body in a tight fit manner.

4. The holder assembly of claim 3, wherein the outer surface comprises a sunken portion whereon a step structure is formed, the first pivoting portion and the second pivoting portion are located on the sunken portion and align with the step structure.

5. The holder assembly of claim 3, wherein the first arm is symmetrically disposed relative to the second arm.

6. The holder assembly of claim 2, further comprising:
   a cover, a second opening being formed on an end of the body opposite to the first opening and connected to the accommodating space, the cover being located on the second opening and slidably connected to the outer surface.

7. The holder assembly of claim 6, wherein the cover is slidably disposed between a first position and a second position, when the base is switched to the first mode, the sliding portion is adjacent to the second opening and contacts against the cover, the cover axially moves to the second position.

8. The holder assembly of claim 1, wherein a slide track is axially disposed on the inner surface, a protrusion is radially disposed on the sliding portion, and the protrusion is slidably disposed on the slide track.

9. The holder assembly of claim 2, wherein when the base is switched from the second mode to the third mode, the supporters pivot relative to the sliding portion to 90 degrees.

10. The holder assembly of claim 1, further comprising:
    a handle, two ends of the handle being respectively connected to the outer surface.

* * * * *